Aug. 13, 1929.  W. M. SCOTT ET AL  1,724,734
ELECTRICAL MEASURING INSTRUMENT
Filed Nov. 21, 1925  2 Sheets-Sheet 2

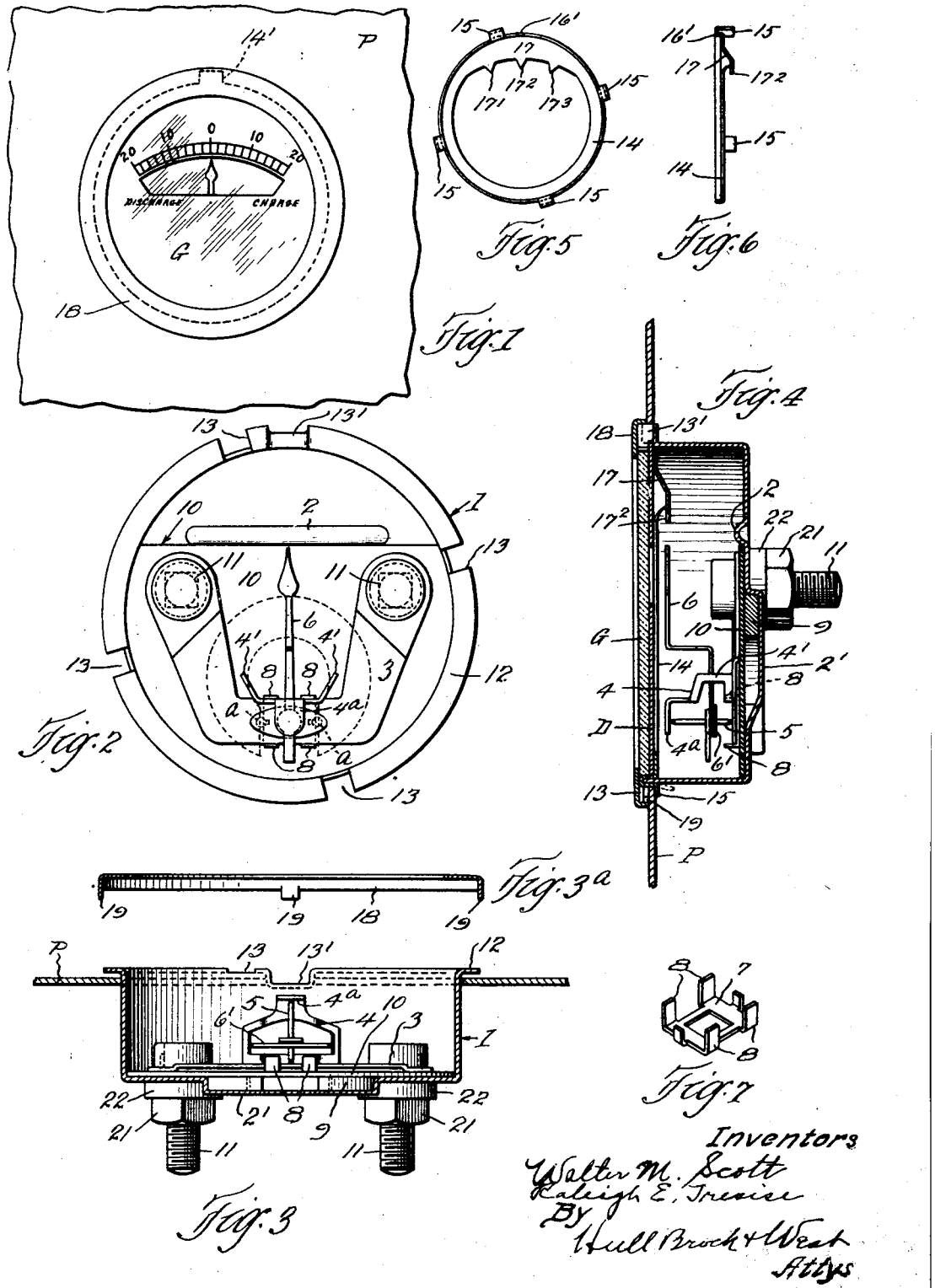

Inventors
Walter M. Scott
Raleigh E. Tresise
By Hull Brock & West
Attys

Patented Aug. 13, 1929.

1,724,734

UNITED STATES PATENT OFFICE.

WALTER M. SCOTT, OF LAKEWOOD, AND RALEIGH E. TRESISE, OF CLEVELAND HEIGHTS, OHIO.

ELECTRICAL MEASURING INSTRUMENT.

Application filed November 21, 1925. Serial No. 70,542.

This invention relates to electrical measuring instruments and has particular reference to an ammeter of the type used on self propelled vehicles for indicating the flow of current to and from the starting and lighting battery.

The principal object of this invention is to provide an ammeter which shall have a minimum number of parts and which is simple in construction, easily assembled and disassembled, and yet capable of accurately indicating the rate of current flowing to and from the battery, and which shall be well adapted for quantity production at a very low cost.

Another object is to provide an instrument which shall be so constructed and assembled as to reduce to a minimum the possibility of incurring a short circuit.

Another advantage accruing from our invention is that we have eliminated the usual current coils and have materially reduced the cost and simplified the construction of the meter while at the same time we have provided an ammeter which is just as effective and efficient in operation as ammeters in which current coils are used.

With these objects in view and others which will become apparent as the description proceeds, the invention consists in the novel features of construction and arrangement of parts, and in the manner of combining and arranging the same as will be hereinafter more fully described and pointed out in the appended claims.

Figure 8:
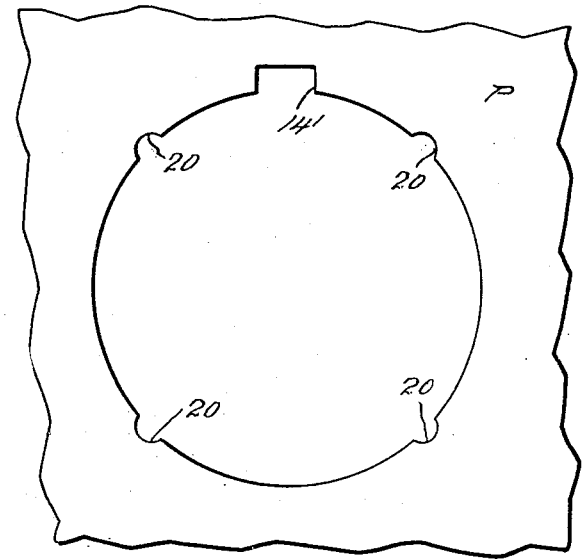
Figure 9:
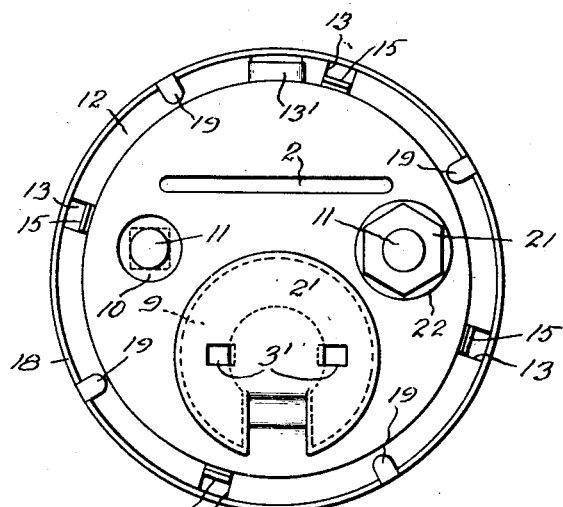
Figure 10:
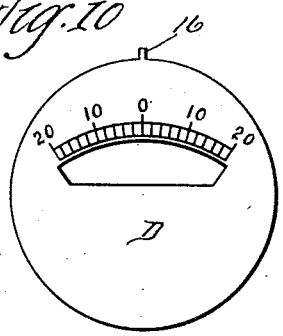

In the drawings Fig. 1 is a front elevation of our improved ammeter secured on an instrument board; Fig. 2 is a top plan view of the casing with the dial and part of the casing removed; Fig. 3 is a front elevation with the casing shown in section showing how the armature and base plate are mounted; Fig. 3ª is a detail view of the annular ring member for securing the glass plate to the casing; Fig. 4 is a side elevation similar to Fig. 3 but taken at right angles thereto; Figs. 5 and 6 are a plan view and a side elevation respectively of the member which supports the dial and the glass; Fig. 7 is a perspective view of a keeper member which is adapted to be secured on the frame member; Fig. 8 is a front view of a part of the instrument board showing the opening in which the meter is secured; Fig. 9 is a bottom plan view of the meter casing and Fig. 10 is a front elevation of the dial.

Describing by reference characters the parts shown in these drawings, 1 represents a circular cup or casing in which the several parts are mounted. The bottom of the casing has a portion 2 bent in or struck up from the bottom thereof, the purpose of which will hereinafter appear. The bottom of the casing also has a bent out portion shown at 2' in Fig. 9 which is of a shape to receive and retain a permanent horseshoe magnet 9 therein. This portion also has a pair of lugs 3' cut and bent out therefrom which serve to hold the magnet in place. Secured within the casing is a U-shaped base or supporting member 3 having a part 4 cut out and bent upwardly as shown in Figs. 3 and 4. The upper portion of the part 4 is bent over parallel with the base to form a shelf, as shown at 4ª, the supporting member and the part 4ª serving to receive and form a bearing for a shaft 5 on which is mounted an indicating needle 6 and an armature 6'. The part 4 is bent on opposite sides as at 4' so as to provide stops for limiting the throw of the needle 6. Clamped around the base member 3 at a point where the shaft 5 engages the same is a grip member 7 of soft iron having lugs 8 formed thereon as clearly shown in Fig. 7. As shown in Fig. 2 the lower end of the U-shaped member 3 has a pair of openings $a$ therein. The keeper 7 is secured around this portion, one pair of lugs extending through the holes $a$, and the other lugs extending around the base member and adapted to be bent over to firmly secure the keeper to the U-shaped member as shown in Fig. 2. This soft iron keeper positioned as hereinbefore described adjacent to a point of higher concentration of the permanent magnetic field tends to further concentrate the lines of force at this point, to increase the life of the permanent magnet, to increase the damping effect of the magnet on the needle and to increase the accuracy and efficiency of the instrument as a whole.

Within the casing beneath the base member 3 there is mounted a disk or bridge 10 of insulating material for insulating the base member 3 from the casing 1. The base member 3 is secured within the casing by means of a pair of screwposts 11 which serve as terminals for the ammeter. These screw posts 11 are provided with a round head, and projecting from the under side of the head is a shank which is square in cross section and which is adapted to fit into a square opening in the frame member 3 as clearly shown in Figs. 2 and 9 and prevents any turning of the posts relative to the frame member. The screw posts also pass through holes in the insulating bridge 10 and through holes in the bottom of the casing. The holes in the bottom of the casing are considerably larger than the holes in the insulating disk 10. The insulating disk is securely held against movement in the casing by means of the hump 2 struck up from the bottom of the casing as hereinbefore described. It will now be clear that the posts 11 pass through the holes in the casing but can not come into contact with the casing. Insulating washers shown at 22 in Fig. 3 also serve to further insulate the posts from the casing. The screw posts are tightened by means of suitable nuts shown at 21. In this way the frame is rigidly secured within the casing and any turning movement of the screw posts relative to the frame member or casing is positively prevented. The necessity for soldering, which is an expensive operation, and which is often the cause of short circuits in ammeters of this character is obviated.

Another important feature of my device is the provision of means whereby the device may be calibrated before the dial, glass and cover are attached and the case sealed. For this purpose the following means are provided: The top of the casing is provided with an overhanging peripheral flange 12 having spaced recesses therein as shown at 13 and secured over the top of the casing is a ring like member 14 having flexible projections or lugs 15 thereon adapted to be bent over to engage in the recesses 13 to secure the same in place on the casing. This annular member 14 has a depressed arc-shaped portion shown at 17 in Fig. 5 and on this arc-shaped portion are a plurality of equally spaced projections 17', 17² and 17³ preferably three in number as shown in Fig. 5. The projections are so spaced that when the pointer is at zero position on the scale it lies immediately opposite to the central projection 17² and when the pointer has been deflected to any desired point on the meter scale to the right or left it is opposite to the projection 17' or 17³. Secured over this member is a dial D of metal, cardboard, or other suitable material having an opening therein as shown in Fig. 10, and having a calibrated scale adjacent the opening. This disk fits into the annular depression in the member 14 and has a tax 16 formed thereon which is adapted to be bent over into a recess 16' formed in the edge of the annular member 14 to hold the same against rotary movement relative to the member 14. When the dial is secured in place the zero point on the dial lies immediately opposite to and above the central projection 17² and the lines on the scale predetermined as calibrating points lie opposite to the projections 17' and 17³. It will now be clear that the parts may be placed in the casing and the device properly adjusted and tested before the dial is secured and before the casing is closed. As shown in Figs. 2, 3, and 9, we provide a recessed portion 13' bent out of the casing 1 which is adapted to engage in a similar recess 14' cut in the instrument board or panel in which the meter is to be secured and cooperates therewith to secure the casing against rotation within the panel.

We also provide a novel means of securing the meter in the instrument board or panel. The opening in the instrument board has a plurality of recesses 20 as most clearly shown in Fig. 8 and also a recess 14' therein, the purpose of which will hereinafter appear. The flexible projections or tongues 15 have their ends flared outwardly slightly so that they may be more readily bent over to the position shown in Fig. 4 to secure the ring member 14 to the casing, and also to secure the meter in the instrument board. The recesses 20 are provided to allow these flared projections 15 to pass through the opening in the instrument board. It will be noted that when the projections 15 are opposite to the recesses 20 that the depressed portion 13' is out of alignment with the recess 14'. After the projections 15 have passed through the recesses 20 the casing is turned counter-clockwise with respect to the opening as seen in Fig. 9 until the bent-out portion 13' coincides with the recess 14'. The casing is then pushed all the way in and the projections 15 are bent outwardly to the position shown in full lines in Fig. 4. The portion 13' is now in engagement in the recess 14' and any turning movement of the casing within the opening is positively prevented, and the lugs 15 are engaging the walls of the opening and prevent removal of the meter and rigidly secure the same within the opening in the dash board.

To assemble the device the magnet 9 is first inserted in the recess in the cup provided therefor and fastened immovably in place by means of the lugs 3' in Fig. 9. The insulator 10 is then inserted, the periphery of the insulator engages the inner periphery of the casing and the hump 2 co-operating therewith serves to hold the insulator in place. The base or supporting member 3 with the movable system mounted thereon is next inserted and the screw posts 11 are inserted and tightened by means of the nuts 21 and washers 22. The annular member 14 is then inserted as hereinbefore described, and the device is tested and adjusted. The dial D is next inserted so that the tab 16 thereon rests in the recess 16' in the ring member 14 to securely hold the dial in place. The annular glass plate G is then placed over the dial and the ring member 18 is placed over the glass plate and the projections 19 thereon are bent down around the overhanging flange 12 to firmly secure the parts together. The device is then ready to be inserted into the instrument board or panel P, the ledge or projections 15 being adapted to be bent over to hold the instrument in the panel as hereinbefore described. The screw posts 11 serve as a means for conducting the current into the instrument. In addition to the electrical and operating advantages secured by the arrangement of parts as hereinbefore described, the detailed construction herein set forth can all be made by stampings, even to the magnet; and the parts can be assembled with a minimum of labor and absolute uniformity of output is secured; while the arrangement of the works wholly independent of the casing permits adjustment to be effected while all the parts of the same are accessible.

It will now be clear that we have provided an electrical measuring instrument which will accomplish the objects of the invention as hereinbefore stated.

Having thus described our invention, what we claim is:—

1. In an electric measuring instrument, in combination a circular casing having a depressed portion therein adapted to receive a magnet, a base member secured within said casing and having a portion struck up therefrom whereby to form a bearing, an insulator between said base member and magnet, a movable system journaled in said bearing, screw posts securing said base member within said casing and serving to conduct a current into said instrument.

2. In an apparatus of the character set forth, the combination with a meter casing, a base member secured within said casing, said base member having a part struck up therefrom whereby to form a bearing, a movable system journaled in said bearing, an insulator between said base member and casing, the bottom of said casing having a portion struck up therefrom whereby to secure said insulator in place, a magnet disposed within said casing adjacent said movable system and a soft iron clip secured to said base member adjacent a point of high concentration of the magnetic field.

3. In an electrical measuring instrument in combination a casing having a depressed portion shaped to receive a magnet therein, a magnet within said depressed portion, a base member within said casing, an insulator between said magnet and said base member, said base member having a portion struck up therefrom and bent over parallel to said base member whereby to form a bearing, a movable system journaled in said bearing.

4. In an electrical measuring instrument a casing having a magnet carried thereby, a base member secured within said casing and insulated therefrom, said base member adapted to support a movable system thereon, a soft iron clip secured to said base member adjacent a point of high concentration of the magnetic field, and a pair of posts securing said base member in place, said pair of posts being mounted independent of said magnet and serving as terminals for the instrument.

5. In an electrical measuring instrument of the class described comprising a substantially cup shaped casing having an overhanging peripheral flange thereon and spaced recesses in said flange, an annular ring member secured to said casing and having spaced lugs thereon adapted to engage in and pass through said recesses in said peripheral flange, a dial nonrotatably supported in said annular ring member, a transparent cover secured to and closing said casing, said lugs adapted to be bent over to secure said casing within an instrument board.

6. In an electrical measuring instrument the combination of a casing and a base member carried thereby, an insulating disk between said base member and casing, a pair of openings in said casing, a pair of openings in said insulating disk of less diameter than the openings in said casing, a pair of openings in said base member, means for securing said base member in said casing comprising a pair of screw posts nonrotatably secured in the openings in said base member and adapted to pass through the openings in said disk and base member, said posts being insulated from said casing and adapted to receive suitable nuts thereon whereby to rigidly secure said base member within said casing.

7. In an ammeter of the class described adapted to receive and support a movable system, a dial support comprising an annular ring member having a depressed arc shaped portion thereon, a plurality of equally spaced projections on said arc shaped portion, means for securing said ring member to said casing in such a position that certain of said projections lie opposite to certain predetermined calibration points, said ring member adapted to receive and non-rotatably support a dial.

8. In an ammeter of the class described, an annular ring member having a depressed portion and an arc shaped portion having a plurality of equally spaced projections thereon, said ring member having means thereon for securing the same within the casing, and a dial and a transparent plate supported by said ring member.

9. In a device of the class described the combination of a casing and an annular ring member secured within said casing, said ring member having a depressed arc shaped portion provided with equally spaced projections, means for securing said ring member to said casing, said ring member adapted to receive and non-rotatably support a dial.

10. In a device of the class described the combination with a meter casing, a base member secured within said casing, said base member being formed to provide a bearing, a magnet arranged within said casing below said bearing and insulated from said base member, an arbor journaled in said bearing, an insulator between said base member and casing, means for securing said insulator against movement with respect to said casing.

11. In an electrical measuring instrument the combination of a casing and a movable system, a one piece base member secured within said casing adapted to support the movable system, an annular ring member non-rotatably secured to said casing and adapted to receive and support a dial, said ring member having a depressed arc shaped portion and a plurality of equally spaced projections on said arc shaped portion.

12. In an electrical measuring instrument, the combination of a casing and a base member carried thereby, an insulating disk between said base member and casing, a pair of openings in said casing, a pair of openings in said disk of less diameter than the openings in said casing, means for securing said base member in said casing comprising a pair of screw posts adapted to pass through corresponding openings in the casing and disk, means for securing said disk against relative movement with respect to said casing whereby said posts are insulated from said casing, said posts being adapted to receive suitable nuts thereon whereby to rigidly secure said base member within said casing.

13. In an instrument of the class described, a cup shaped casing having a depression therein adapted to receive a magnet, a portion of the bottom of said casing being cut out and bent over to secure said magnet in place, said casing having a portion struck up inwardly therefrom, an insulator positioned within said casing, said struck up portion cooperating with said insulator and casing to secure the insulator against relative movement with respect to said casing.

14. In an electrical measuring instrument, a casing having a depressed portion therein adapted to receive a magnet, a base member secured within said casing having a bearing thereon, an insulator between said base member and magnet, a movable system journaled in said bearing, posts extending through said base member and casing and holding said base member in place, said posts serving to conduct a current into and from said instrument, and a magnet arranged within said casing below said base member and movable system.

15. In an electrical measuring instrument, a casing having a depressed portion shaped to receive a magnet therein, a magnet arranged within said depressed portion, and a base member non-rotatably secured within said casing, an insulator between said magnet and base member, said base member having a portion bent over to form a bearing and a movable system journaled in said bearing, said magnet being disposed below said movable system and base member.

16. In an electrical measuring instrument of the class described, a casing having an overhanging peripheral flange thereon and spaced recesses in said flange, a ring member secured to said casing and having spaced lugs thereon adapted to engage in and pass through the recesses in said peripheral flange, a dial non-rotatably supported by said ring member, a transparent cover secured to and closing said casing, said lugs being adapted to be bent over to secure said casing within an instrument panel.

17. In an ammeter of the class described adapted to receive and support a movable system, a dial support comprising a ring member having a plurality of equally spaced projections thereon, means for securing said ring member to said casing in such a position that certain of said projections lie opposite to certain predetermined calibration points, said ring member being adapted to receive and non-rotatably support a dial.

18. In an instrument of the class described, a casing having a depression therein adapted to receive a magnet, an insulating disk non-rotatably secured in said casing, a base member non-rotatably secured within said casing and insulated from said magnet and a movable system carried by said base member, said casing having a portion struck up therefrom to secure the insulating disk against relative movement with respect to said casing and base member.

19. In an electrical measuring instrument of the class described comprising a casing, a base member arranged within said casing and insulated therefrom, a movable system carried by said base member, a magnet arranged beneath said base member and insulated therefrom, a dial secured over the front of said casing, a transparent cover secured over said dial and means securing said dial and cover in place, means for securing said base member against movement with respect to said casing, said means being insulated from said casing.

20. In an electrical measuring instrument as set forth in claim 19, a soft iron clip secured to said base member adjacent the point of high concentration of the magnetic field.

21. In an instrument of the class described, the combination of a casing having a ring member non-rotatably secured thereto, said ring member having a plurality of spaced projections thereon, a dial non-rotatably secured to said ring member, said ring member being secured to said casing in such a position that certain of said projections lie opposite to certain pre-determined calibration points.

22. In an electrical measuring instrument of the class described comprising a casing having a pair of openings in its bottom, a base member arranged within said casing and having a pair of openings adapted to be brought into alignment with the openings in said casing bottom respectively, an insulating disk non-rotatably secured within said casing between said base member and the bottom of said casing and having a pair of openings adapted to be brought into alignment with the openings in said casing and base member, posts extending through said openings for securing said base member in place, the openings in said insulating disk being smaller than the openings in said casing whereby said posts are insulated from said casing, a movable system carried by said base member, said casing having a peripheral flange thereon having recesses therein spaced apart, a dial secured over the front of said casing and a transparent cover secured over said dial and a ring member securing said dial and transparent cover in place and having a plurality of spaced lugs thereon adapted to engage with said peripheral flange whereby to hold the parts in place.

23. In an electrical measuring instrument, a casing adapted to receive a magnet therein, a base member secured within said casing and having a bearing thereon, an insulator between said base member and magnet, a movable system journaled in said bearing, posts extending through said base member and casing and holding said base member against rotation, said posts serving to conduct a current into and from said instrument, and said magnet being arranged within said casing below said base member and independent of said posts.

24. In an electrical measuring instrument, a casing adapted to receive a magnet therein, a magnet arranged within said casing, a base member non-rotatably secured within said casing, an insulator disposed between said magnet and base member, said base member having a portion shaped to define a bearing and a movable system journaled in said bearing, and a soft iron clip secured to said base member adjacent a point of high concentration of the magnetic field.

25. In an instrument of the class described a casing, a magnet arranged within said casing, an insulating member secured in said casing, a base member non-rotatably secured within said casing and insulated from said magnet, a movable system carried by said base member, and means for securing said insulating member against relative movement with respect to said casing and base member, said magnet being disposed below said base member and movable system.

In testimony whereof, we hereunto affix our signatures.

WALTER M. SCOTT.
RALEIGH E. TRESISE.